(12) United States Patent
Pionetti et al.

(10) Patent No.: US 7,677,837 B2
(45) Date of Patent: Mar. 16, 2010

(54) DEVICE FOR TRANSFERRING FLUID BETWEEN TWO FLOATING SUPPORTS

(75) Inventors: Francois-Regis Pionetti, La Baleine (FR); Midir Rivoal, Sigottier (FR)

(73) Assignee: Saipem S.A., Montigny le Bretonneux (FR)

( * ) Notice: Subject to any disclaimer, the term of this patent is extended or adjusted under 35 U.S.C. 154(b) by 161 days.

(21) Appl. No.: 11/919,765

(22) PCT Filed: May 11, 2006

(86) PCT No.: PCT/FR2006/001053

§ 371 (c)(1),
(2), (4) Date: Nov. 1, 2007

(87) PCT Pub. No.: WO2006/120351

PCT Pub. Date: Nov. 16, 2006

(65) Prior Publication Data

US 2009/0097923 A1     Apr. 16, 2009

(30) Foreign Application Priority Data

May 13, 2005    (FR) .................................. 05 04848

(51) Int. Cl.
*F16L 1/12*          (2006.01)
(52) U.S. Cl. .............................. 405/171; 405/172; 441/4
(58) Field of Classification Search .................. 405/169, 405/170, 171, 172, 166, 158; 441/4, 5
See application file for complete search history.

(56) References Cited

U.S. PATENT DOCUMENTS 3,466,680 A * 9/1969 Schirtzinger .................... 441/5
4,183,697 A * 1/1980 Lamy .......................... 405/170
4,263,004 A * 4/1981 Joubert et al. ............... 405/171

(Continued)

FOREIGN PATENT DOCUMENTS

GB       2390351 A  *  1/2004

(Continued)

OTHER PUBLICATIONS

XP-002361808, Keller Didier et al., Half Year Results 2004, Analysts Presentations Amsterdam London.

(Continued)

*Primary Examiner*—Frederick L Lagman
(74) *Attorney, Agent, or Firm*—Cohen Pontani Lieberman & Pavane LLP

(57) ABSTRACT

A device for transferring fluid between two floating supports anchored to the sea bottom, having a rigid central undersea pipe installed below the surface with its ends each being connected to respective ones of two supports via a flexible hose. The main portion of the rigid central pipe includes or co-operates with buoyancy elements such that the central pipe adopts, in a quasi-static rest state, a configuration of an arch, preferably following a curve such that the angles between the half-lines of the axes of the rigid pipe and the horizontal half-lines at each of its ends extending towards the other end present absolute values of less than 20° and the flexible hoses present lengths and curvatures such that variations in the curvatures of the flexible hoses are suitable for compensating the movements of the floating supports.

24 Claims, 13 Drawing Sheets

U.S. PATENT DOCUMENTS

| | | | | |
|---|---|---|---|---|
| 5,480,264 | A * | 1/1996 | Hunter | 405/169 |
| 5,505,560 | A * | 4/1996 | Brown et al. | 405/169 |
| 5,944,448 | A * | 8/1999 | Williams | 405/169 |
| 6,394,154 | B1 * | 5/2002 | Pollack | 441/3 |
| 6,415,828 | B1 * | 7/2002 | Duggal et al. | 141/387 |
| 6,558,215 | B1 | 5/2003 | Boatman | |
| 6,779,949 | B2 * | 8/2004 | Barras et al. | 405/158 |
| 2001/0031174 | A1 | 10/2001 | Olivier et al. | |
| 2003/0091396 | A1 * | 5/2003 | Barras et al. | 405/158 |

FOREIGN PATENT DOCUMENTS

| | | |
|---|---|---|
| WO | WO 99/62762 | 12/1999 |
| WO | WO 01/83291 | 11/2001 |
| WO | WO 01/96771 | 12/2001 |
| WO | WO 2004/068014 | 8/2004 |
| WO | WO 2005/090152 | 9/2005 |

OTHER PUBLICATIONS

XP-002361806, Single Buoy Moorings Inc., Gravity Actuated Pipe, Deep Water Technology.

* cited by examiner

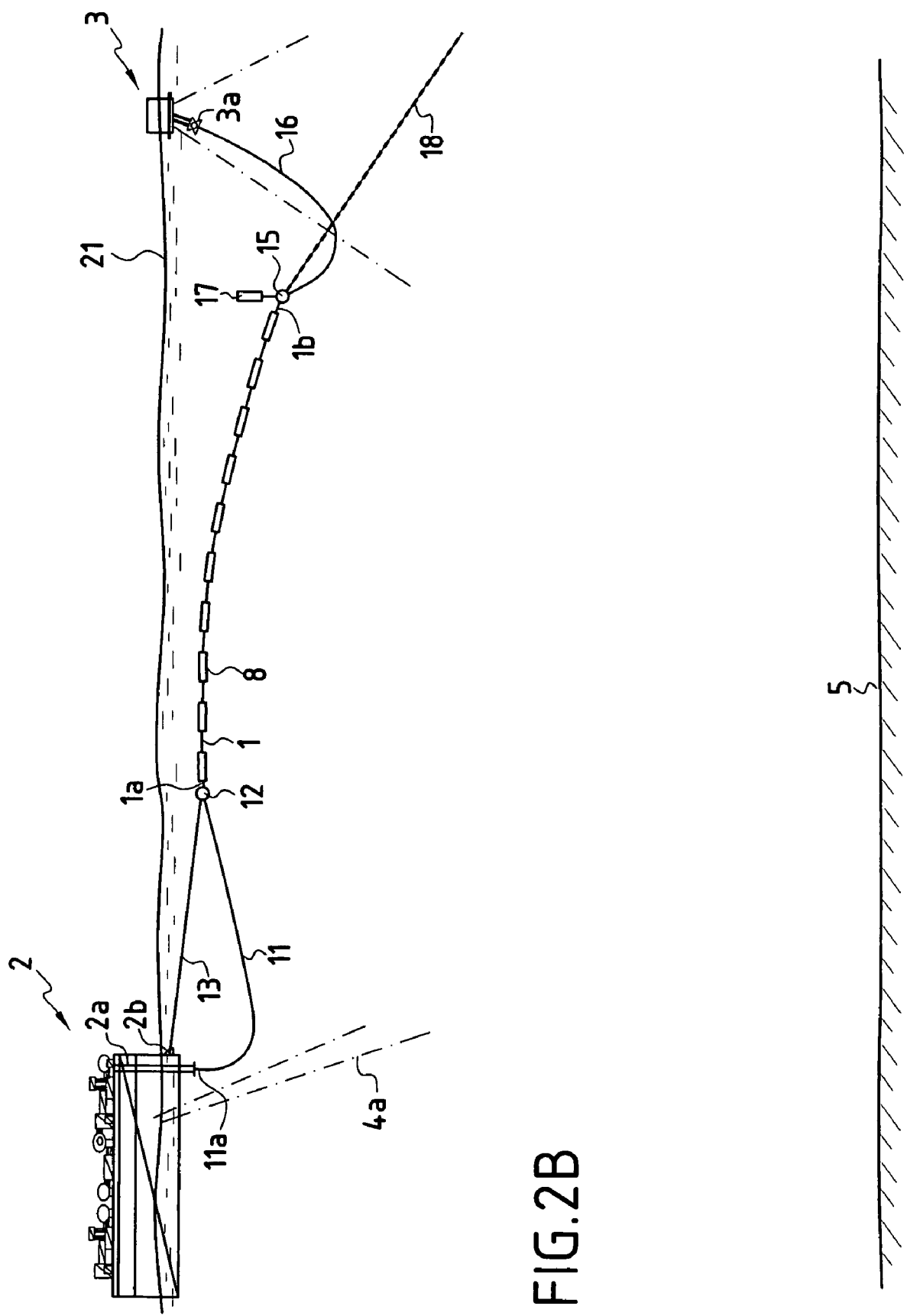

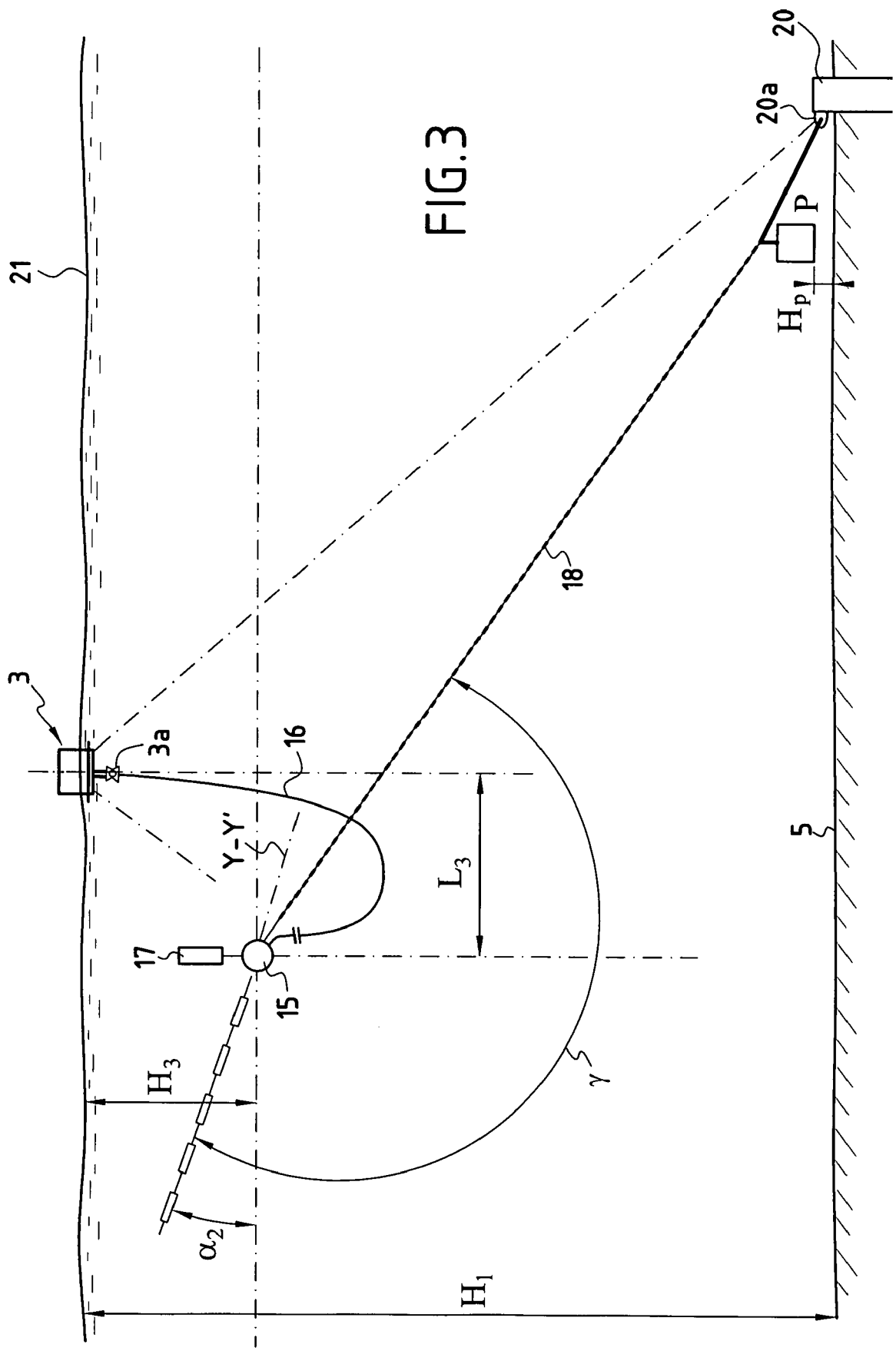

DEVICE FOR TRANSFERRING FLUID BETWEEN TWO FLOATING SUPPORTS

This is a U.S. national stage of application No. PCT/FR2006/001053, filed on May 11, 2006. Priority is claimed on the following application(s): Country: France, Application No.: 05/04848, Filed: May 13, 2005, the content of which is incorporated here by reference.

BACKGROUND OF THE INVENTION

Field of the Invention

The present invention relates to a device for transferring fluid between two floating supports anchored to the sea bottom, the device comprising a rigid central undersea pipe installed under the surface with its ends connected to respective ones of said two supports via respective flexible hoses.

More particularly, the present invention relates to the known field of long-distance connections installed under the surface of the type comprising an undersea pipe interconnecting two anchored supports floating at the surface of the sea.

Once the depth of water becomes great, working a production field, and in particular an oil field, generally requires a floating support. The floating support generally has anchor means so as to remain in position in spite of the effects of currents, winds, and swell. It also generally includes means for storing and treating oil, together with means for offloading it to tankers that take it away. Such floating supports are generally referred to as floating, production, storage, and offloading (FPSO) supports.

The offloading means are generally constituted by a buoy that is anchored at a distance from the FPSO, so as to be capable of receiving tankers of considerable tonnage, possibly measuring 250 meters (m) to 300 m in length for tonnages of 300,000 deadweight tons (DWT) to 450,000 DWT, or more. Such offloading buoys are known as single point mooring (SPM) buoys and they are generally anchored to the sea bottom by a multitude of lines, generally four, six, or eight lines, connected to anchor points situated on the sea bottom, said anchor points being either anchors, or mooring sinkers, or indeed suction anchors.

For safety purposes while maneuvering offloading tankers, it is common practice for the export buoy to be situated far away from the FPSO, at a distance that may be as much as 1500 m to 2000 m, with offloading supertankers.

When the water is shallow, e.g. a few hundreds of meters, the pipe making the connection between the FPSO and the buoy is installed in conventional manner on the sea bottom, with a bottom-to-surface connection being installed at each end, both beside the FPSO and beside the buoy.

In deep water, e.g. depths of 1000 m or 2000 m, or more, it is desired to avoid going down to the sea bottom and then coming back up to the surface, since the extra length created by the downward and upward pipes becomes excessive compared with the horizontal distance between the two floating supports, both in terms of head losses and in terms of crude oil cooling, given that the sea bottom is at substantially 4° C.

It is then preferred to use so-called subsurface connections, which are generally installed at a depth of 150 m to 300 m, since at that depth surface swell has practically no direct dynamic effect on the export pipe, and furthermore ships can pass freely without running any risk of interfering with said subsurface connections.

Numerous systems have been developed for making such subsurface connections, some of them making use of flexible hoses that are very expensive since they are generally of large diameter, and others making use of thick-walled steel pipes that are associated with buoyancy elements.

All such devices need to guarantee a very high level of reliability because of the danger of major pollution in the event of such a pipe breaking, it being understood that the lifetime desired for such installations is commonly not less than 20 years, and may be even greater than 30 years.

Such devices are subjected to the direct action of swell and current, but since they are connected mechanically to two floating supports, they are also stressed by the movements of said floating supports. In order to achieve the looked-for lifetimes, export pipes thus need to withstand fatigue phenomena within the material that such pipes are made of, where the most critical of said fatigue phenomena are caused by the almost continuous movements of said floating supports.

An FPSO presents large surfaces that are subjected to swell, to winds, and to currents, and as a result it moves almost continuously, in terms of roll, pitch, surge, and yaw, which can become extreme in a storm. Furthermore, resonant frequency phenomena inevitably amplify such movements, and thus excite the export pipe to which said FPSO is mechanically secured.

Likewise, although the offloading buoy is smaller in dimension than an FPSO, it too is subjected to swell and to current, and although it is anchored in extremely firm manner, it too excites said export pipe.

To reduce the tension generated by the weight of the rigid pipe and to limit tension at its ends, buoyancy elements imparting positive buoyancy thereto have been used to create one or two waves (catenary-shaped curves) between the two floating supports. Such curvature give the pipe extra length between its ends and makes it possible to accommodate variations in length due to relative displacement between the floating supports.

The two-wave or "symmetrical W" disposition (see FIG. 1A) is known that can be made using flexible hoses but that can also be made using large-diameter steel pipes of considerable thickness. With such pipes, leaktight flexible joints known as "flexjoints" are generally installed at each of its ends so as to improve mechanical decoupling between said floating supports (FPSO and buoy) and said thick-walled rigid export pipe. That disposition has been installed on the Girassol field off Angola.

The so-called "asymmetrical W" disposition is also known (see FIG. 1B) in which the "V" shape beside the offloading buoy dips to a much greater depth. This results in better behavior of the thick-walled large-diameter steel pipe in terms of the fatigue generated by the quasi-continuous movements of the offloading buoy, which movements excite the entire catenary, mainly in its minimum curvature zone situated in the vicinity of the point where the tangent is horizontal. In that configuration, the end of the pipe beside the buoy needs to be reinforced by gradually increasing the thickness of the pipe, and in some configurations by interposing a conical portion of pipe presenting thickness that varies continuously over a length that may be as great as 15 m to 20 m, or more.

The main drawback of that configuration is the increase in the weight of the pipe, and thus in the tension at the offloading buoy, which requires additional buoyancy and thus generates significant extra cost.

The so-called "symmetrical W" disposition is known that includes a submerged intermediate buoy, thus making it possible to decouple the end of the undersea pipe radically form the movements generated by the offloading buoy, the connection between the submerged buoy and the offloading buoy being provided by a flexible hose.

That configuration requires two anchor systems, one associated with the offloading buoy and the other with the submerged intermediate buoy, thereby leading to considerable extra cost because of the increase in the number of anchor points and in the length of the anchor lines, particularly when the depth of the water reaches or exceeds 2000 m to 3000 m, or even more.

The so-called simple catenary disposition is known as described in WO 01/83291 which consists in installing a pipe that dips deeply going from the FPSO, i.e. under the zone of turbulence, and that rises directly to the offloading buoy via flexible hoses at the ends of the steel pipe. That alternative is the simplest version and presents good behavior with respect to fatigue, but it nevertheless requires reinforced forgings to be used at its ends, mainly beside the offloading buoy. In addition, the catenary dips very deep, giving rise to considerable tension at its ends. Although this increase in tension does not give rise to any particular problem at the FPSO, given the size of that floating support, it is nevertheless necessary, at the offloading buoy end, to increase buoyancy to a large extent and for the strength of the structure to be reinforced considerably.

In a variant described in WO 01/83291, the connection with the FPSO is made via a length of flexible hose, the tension in the simple catenary then being taken up by a chain connecting the end of the rigid export pipe to said FPSO. In that configuration, as in the above-described "W" configurations, firstly the curvatures of the rigid pipe are considerable, and secondly the relative movements of the floating support continue to be absorbed for the most part by variations in the curvature of the steel pipe, and more particularly in its zones of maximum curvature, with these two phenomena giving rise to fatigue and shortening the lifetime of installations, as explained below. Furthermore, such configurations are difficult to install. Other drawbacks of those various configurations are described in the detailed description given below with reference to FIGS. 1A to 1D.

Numerous tests carried out on numerical models and on physical models, and observations made on existing sites, such as the Girassol field in Angola or in the Gulf of Mexico, have shown that the fatigue phenomena in all of those systems are cumulative in configurations that vary extremely randomly, which means that in order to guarantee a very high level of operating safety, it is necessary to envisage theoretical fatigue lifetime objectives that are much longer, leading to safety factors of three times to five times or even ten times greater than the desired lifetime, which itself can commonly reach and even exceed 30 years.

WO 01/96771 describes a subsurface fluid transport pipe between two floating supports with a rigid pipe having its two ends supported by buoys 3 and 4 each co-operating with ballasting means or suspended sinkers 32, 33 (FIG. 8) or that are anchored to the bottom of the sea by tensioning links 18, 19 (FIGS. 1 and 6). WO 01/96771 thus describes an assembly that is either of the type that is anchored to the bottom (FIGS. 1, 2) or else of the free type with a suspended sinker (FIGS. 8, 8B).

That system is then either too stiff (when anchored to the bottom at both ends), or else too flexible (with a sinker suspended from each end). As a result, under the effects of swell and of cross-currents, the installation is either subjected to fatigue phenomena or else is too unstable. Overall, the behavior of that installation comes close to the behavior of installations in the prior art W configuration.

WO 99/62762 likewise describes a symmetrical installation in which the rigid fluid transport pipe is also positioned in a horizontal plane, and thus with buoyancy that is practically in equilibrium, which is likewise harmful in withstanding the fatigue phenomena because of instabilities under the effects of swell and currents.

WO 2005/090152 describes in speculative manner various installation systems in which firstly the central rigid pipe is likewise positioned in a horizontal plane, and secondly the anchoring at the ends of said central rigid pipe is practically vertical and therefore confers practically no stability, whether vertically or transversely, thus making said rigid pipe extremely sensitive to the fatigue phenomenon as generated by swell and by cross-currents.

OBJECTS AND SUMMARY OF THE INVENTION

One embodiment of the present invention provides a device for transferring fluid between two floating supports anchored to the sea bottom and comprising a central rigid undersea pipe installed below the surface, with its ends connected to respective ones of said two supports via respective flexible hoses, in which:

a) the main portion of said rigid central pipe (1) includes or co-operates with buoyancy elements (8) such that, in a quasi-static rest state, said rigid central pipe adopts a configuration in the form of a curved arch, preferably in the form of a curve that is substantially catenary-shaped such that the angles ($\alpha_1$, $\alpha_2$) between the half-lines of the axes (XX', YY') of said rigid pipe and the horizontal half-lines at each of its ends extending towards the other end present absolute values of less than 20°, and preferably of less than 15°; and b) said flexible hoses are of lengths and curvatures such that the variations in the curvatures of said flexible hoses are suitable for compensating the movements of the floating supports; and c) said rigid pipe is connected at each end by a tensioning link either to one of said two floating supports or to the sea bottom, said tensioning links being connected respectively:

at a first end, to a said floating support, said first end including or co-operating with ballasting means; and at its second end, to the sea bottom, said second end including or co-operating with additional buoyancy means.

By its configuration in the form of a curved arch, it can be understood that said rigid pipe does not lie in a horizontal plane between its two ends, but presents curvature that is either convex if it is situated above its said two ends, or concave if it is situated beneath its said two ends.

Maintaining some minimum value of curvature in said rigid pipe serves to avoid producing instabilities of the vibrational type under the effects of swell and currents which could lead to curvature being reversed, with that representing large variations in stress and thus having the effect of considerably reducing the lifetime of said pipe.

It will be understood that said end connected by a said tensioning link to one of said two floating supports is then not connected to the sea bottom and includes or co-operates with ballasting means and does not include or co-operate with buoyancy means, and conversely said end connected to the sea bottom by a said tensioning link is not connected to the other said floating support by a tensioning link and includes or co-operates with buoyancy means and does not include or co-operate with ballasting means.

This asymmetrical configuration of the two ends in accordance with the invention provides a good compromise between stability and flexibility for the installation so as to reduce fatigue phenomena associated with swell and with currents that can affect the lifetime of the installation. In particular, an optimum compromise is obtained by varying the angle of inclination of said tensioning links.

More particularly, the angles $\alpha_1$, $\alpha_2$ between the axes of said rigid pipe at its ends and the horizontal are maintained at absolute values lying in the range 2° to 20°, and preferably 5° to 15°.

Preferably, said first end of said rigid pipe is connected to the floating support that is the more stable of said two floating supports.

A floating support is said to be "more stable" when it is the floating support that is subjected to less movement as a function of movements of the sea associated with swell and currents, i.e. the floating support that is the heavier and/or the more bulky and/or better anchored.

Floating supports of the invention may be constituted by platforms for operating oil fields or by ships, by buoys, or by floating tanks anchored to the sea bottom.

In a particularly advantageous embodiment of the invention, the two floating supports are constituted respectively by a floating support of the FPSO type and by an offloading buoy.

Preferably, said rigid pipe is connected at its said first end to said floating support of the FPSO type.

Thus, for the rigid central pipe, the minimum radius of curvature of its curve in the quasi-static rest state (Rm) is more than four times and preferably more than ten times the ultimate minimum radius of curvature of the pipe, where said ultimate minimum radius of curvature corresponds substantially to maximum stress in the material from which the pipe is made, in particular steel, under the effect of bending alone, and is equal to 66% of the elastic limit of said material.

For a standard rigid pipe of steel having a diameter of about 500 millimeters (mm), the minimum radius of curvature Rm of said rigid central pipe, when in the form of a catenary shape, is 750 m, preferably 1500 m.

In prior art configurations, rigid steel pipes present large amounts of curvature and the variations in the distance between the floating supports are compensated by variations in the curvature of the rigid pipe, in its zone of maximum curvature, thus giving rise to large variations in stress, with the combination of these two phenomena giving rise to a radical reduction in the lifetime of said rigid pipes, as mentioned above.

Thus, for the W configuration, the minimum radii of curvature are of the order of 1.2 times to two times the value of the ultimate minimum radius of curvature. These values could theoretically be increased, but the excursions of the two floating supports one relative to the other would then be drastically reduced, which goes against the looked-for objective. Although it is possible, in shallow waters, to perform an anchoring method that is passive (not dynamic) and effective in anchoring floating supports in order to limit their excursions, as soon as the depth of the water reaches or exceeds 1000 m to 1500 m, such anchor systems do not make it possible to achieve better than ±4% of the depth of the water, which then means that the export pipe needs to have great capacity for excursion. Thus, the extreme near and far configurations where the supports are respectively as close together and as far apart as they can get, subject the rigid steel pipe to very large variations in force, particularly when the pipe is a large-diameter pipe, thereby drastically reducing the fatigue lifetime of the system.

The single dipping catenary configuration is in a stress situation that is similar since the two floating supports induce forces that are not filtered and that are cumulative. Furthermore, at the surface connections, tensions are very high, thereby giving rise to problems of vibration. Those two types of excitation are cumulative, so the fatigue lifetime of the system is considerably reduced thereby.

Thus, in order to achieve the desired capacity for excursion, the solution proposed in the prior art is either to increase the number of arches, or else to locally increase the curvature of the pipe. Increasing said curvature has the effect of locally increasing stresses, and for small displacements of the floating supports, variations in the radius of curvature give rise to large variations in stress, thereby considerably reducing the fatigue lifetime.

The disposition of the present invention enables fatigue to be reduced considerably, and thus enables the lifetime of the rigid pipe to be increased correspondingly, where such lifetime is determined firstly by the magnitude of the stress and secondly by the amplitude of variation in the stress to which the pipe is subjected. In the invention, in a quasi-static rest state:

firstly the curvature of the rigid pipe is very small (the radius of curvature is very large); and secondly the amplitude of variation in said radius of curvature, during excursions of the floating supports, is drastically reduced compared with prior configurations.

Another advantage of the invention is to implement a length of rigid pipe that is shorter compared with prior art pipes involving large amounts of curvature, thereby reducing head losses and diminishing costs.

The invention is also particularly advantageous, specifically in that it requires a minimum amount of anchoring to the sea bottom, thereby reducing costs, and also in that it enables the device of the invention to be installed at sea very easily from a laying ship, as explained below.

In a preferred embodiment, said tensioning links form respective angles ($\beta$, $\gamma$) with the axes XX', YY', of said rigid pipe at its ends that are suitable, when said floating supports move so that the distance between them varies, for varying and for allowing the ends of said rigid pipe to move vertically, with said angles presenting values in the quasi-static rest state that are less than 150°, and preferably less than 100°.

Together with this turning movement of said tensioning links, there also occur vertical displacements of the ends $1a$, $1b$ of said rigid pipe. Thus, in the event of relative movement of the two floating supports, regardless of whether they move apart from each other or towards each other, the angles $\gamma$ and $\beta$ between said tensioning links and the tangents to the ends of the pipe can vary and in particular, when the floating supports move apart from each other, they can increase up to 180° (maximum angle), thereby providing the extra length needed to ensure that said movement has little effect on the traction or compression forces at said ends of the rigid pipe, and thus little effect on varying the curvature of said rigid pipe, and thus furthermore little effect on variation in its stress.

Said ballasting means and said buoyancy means at the ends of the rigid pipe make it considerably easier to implement the invention, as explained below, since it is by adjusting said means that it is possible to adjust the shape of the curvature of said rigid central pipe during the last step in the procedure for installing the device of the invention.

In practice, the device of the invention makes it possible to obtain a radius of curvature for the thick-walled steel pipe that is very great, i.e. greater than four times and preferably greater than ten times the ultimate minimum radius of curvature of the pipe, said ultimate minimum radius of curvature corresponding substantially to a maximum stress in the material under the effect of bending alone that is equal to 66% of the elastic limit of said material.

The steel pipe can be lightened so as to compensate exactly for its weight in water, thereby obtaining a configuration that is rectilinear, i.e. with a radius of curvature that is infinite, however in order to avoid vibratory phenomena in vertical, horizontal, or oblique planes, and in order to maintain the curve in a vertical plane, it is preferred for the pipe to present curvature that is either convex (positive buoyancy) or concave (negative buoyancy).

The depth at which the ends of the rigid pipe initially at rest are positioned, and the angles of the pipe at its ends, are preferably substantially identical at both ends of the rigid pipe.

In a preferred embodiment, said flexible hoses are connected to the ends of said rigid central pipe via flexible mechanical joints, each of which joints is mechanically connected by a respective tensioning link either to the floating support or to the anchor point situated at the sea bottom.

Said flexible mechanical joints allow said tensioning links, floating supports, and flexible hoses to move without significantly modifying the compression or traction forces on said ends compared with a quasi-static rest state, thereby limiting the effects of wear on the attachment points.

In a particular implementation, a said flexible mechanical joint comprises:

a rigid tube connected at its ends to a respective end of said rigid pipe and to a said flexible hose; and a main body constituting a forging defining:

an outside surface to which said tensioning links are connected and, where appropriate, said ballasting means or said buoyancy means; and an inside surface defining an empty passage through which said tube passes; and said inside surface of the main body and said tube supporting a laminated abutment of preferably spherical type, comprising layers of elastomer that are circularly symmetrical about a respective axis, providing a flexible mechanical connection between said main body and said tube, so as to allow said tube to move angularly relative to the main body within a cone having an angle at the apex lying substantially on said axis of symmetry of said laminated abutment and presenting a maximum value δ equal to 15°.

According to other advantageous characteristics:

said ballasting means are constituted by a heavy chain suspended at said first end; and said buoyancy means are constituted by a buoy from which said second end is suspended.

Also advantageously, the flexible hose providing the connection between the rigid pipe and said floating support, preferably the flexible hose providing the connection with a floating support connected to the sea bottom by a said tensioning link, more preferably an offloading buoy, presents an S-shaped configuration.

This embodiment makes it possible to avoid the flexible hose interfering with said tensioning link serving to anchor the end of the rigid pipe to the sea bottom.

This type of configuration in which the flexible hose is disposed above the end of the rigid pipe is easier to implement when the tube providing the connection between the end of the rigid central pipe and said flexible hose presents an upwardly-curved end beside the flexible connection.

According to another advantageous characteristic of the present invention, said rigid pipe includes buoyancy elements constituted by a thermally-insulating foam distributed all along and all around said pipe, preferably in substantially uniform and continuous manner so as to provide both thermal insulation and buoyancy for said rigid pipe.

In a preferred variant embodiment, said rigid pipe presents curvature that is convex towards the surface of the sea. It is also possible for said rigid pipe to present curvature that is concave towards the surface of the sea. Nevertheless, it is preferred to implement a rigid pipe that presents curvature that is convex towards the surface since in a configuration of this type it is found that variations in the curvature of the rigid pipe, and thus stresses, are smaller than in a concave configuration, thereby correspondingly increasing the lifetime of said pipe. In addition, installation is made easier, as explained in greater detail in the detailed description.

The present invention also provides a method of installing a device of the invention at sea from a laying ship on the surface, the method comprising the following successive steps:

1) connecting a said tensioning link to the sea bottom, or where appropriate to a first floating support, preferably an offloading buoy;

2) assembling and laying the rigid central pipe by assembling together unit pipe elements that include or co-operate with said buoyancy elements, the first unit pipe element being fastened to the end of a said tensioning link;

3) fastening another said tensioning link to the end of the last pipe element, and then to a second floating support or to the sea bottom, where appropriate;

4) installing said ballasting means and said buoyancy means at the ends of the rigid pipe; and then 5) installing said flexible hoses between the floating supports and said first and second ends of the rigid pipe.

Preferably, in the method of the invention:

in step 1), said tensioning link is connected to the sea bottom beside said less stable floating support, preferably an offloading buoy; and in step 3), said other tensioning link is fastened to a said more stable floating support, preferably of the FPSO type.

BRIEF DESCRIPTION OF THE DRAWINGS

Other characteristics and advantages of the present invention appear in the light of the following detailed description given with reference to the following figures, in which:

FIG. 2B shows the configuration of the FIG. 2A device in the absence of heavy chains at the end of the rigid pipe;

FIG. 3 is a side view relating to FIG. 2A showing details of how the rigid pipe of said subsurface connection is connected to said buoy, and also of how it is anchored;

DETAILED DESCRIPTION OF THE PRESENTLY PREFERRED EMBODIMENTS

In FIGS. 1A to 1D, there are shown various prior art configurations in which there can be seen a crude oil export pipe 1 connecting an FPSO 2 to an offloading buoy 3 floating on the surface and anchored respectively by anchor lines 4a and 4b connected to anchor points (not shown) situated on the sea bottom 5, such as anchors, mooring sinkers, or suction anchors.

Figure 1A:
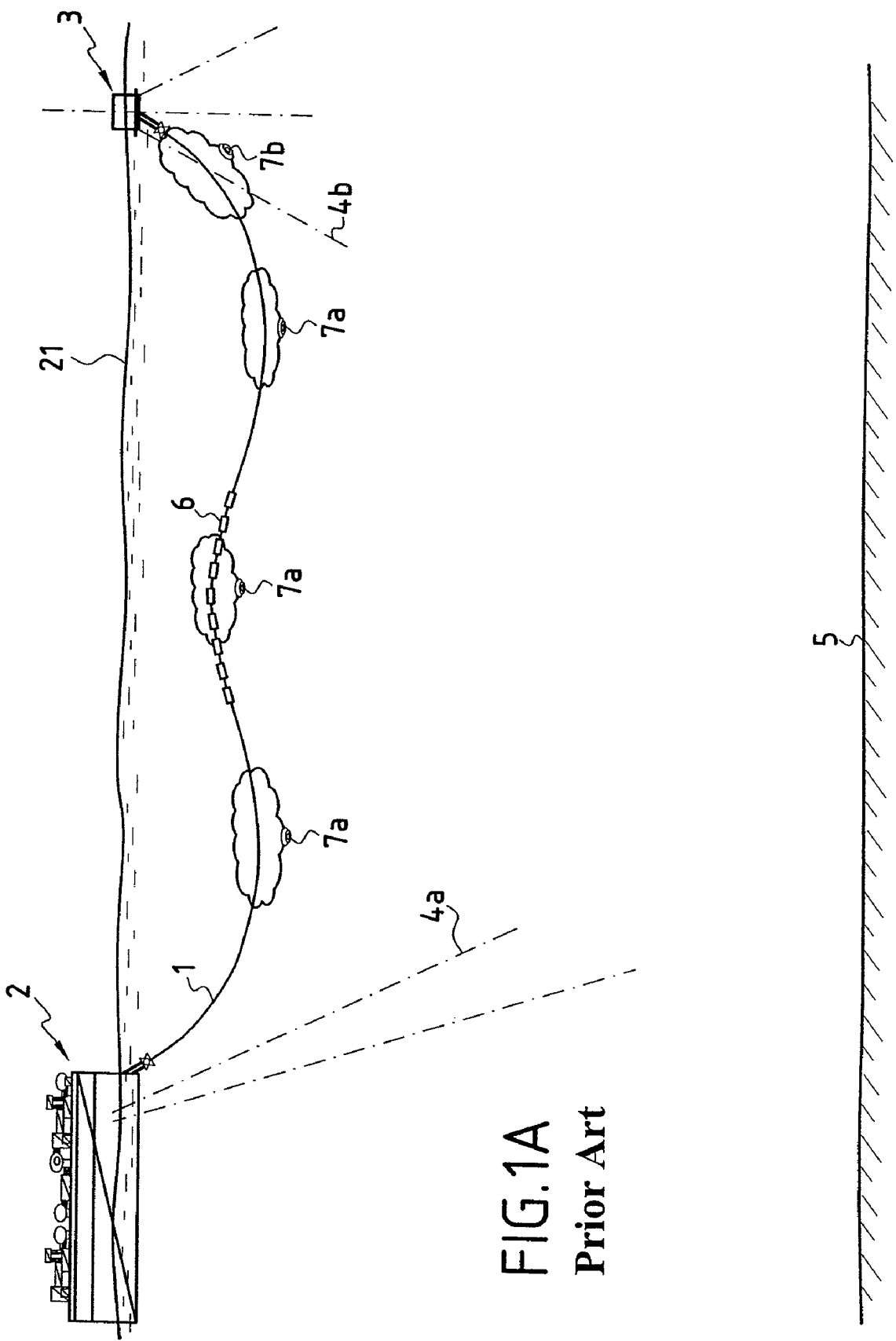
FIGS. 1A and 1B are side views of a subsurface connection device in the configuration known respectively as symmetrical W (FIG. 1A) and asymmetrical W (FIG. 1B) between an FPSO and an offloading buoy, in the prior art.
Figure 1B:
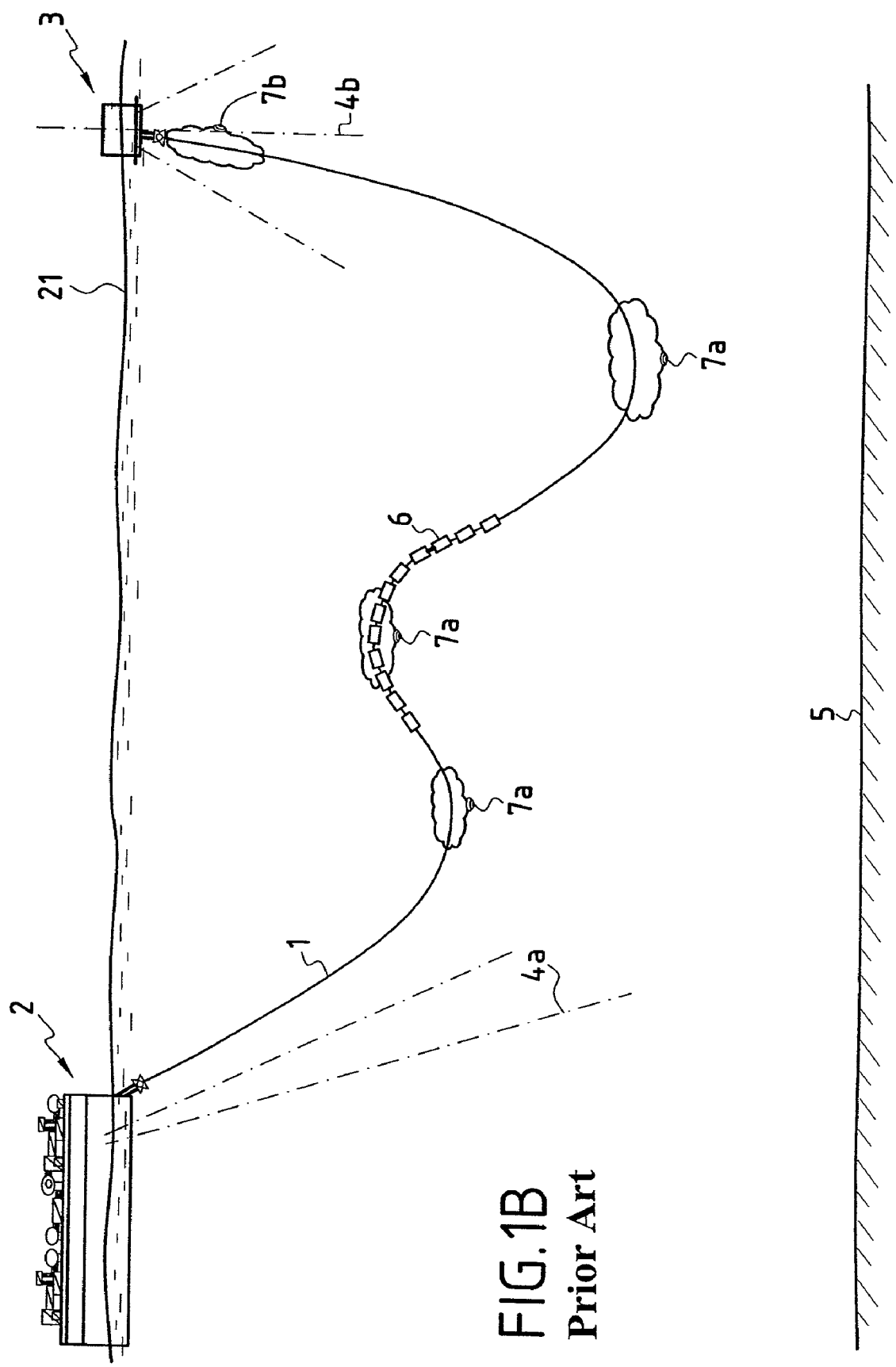
Figure 1C:
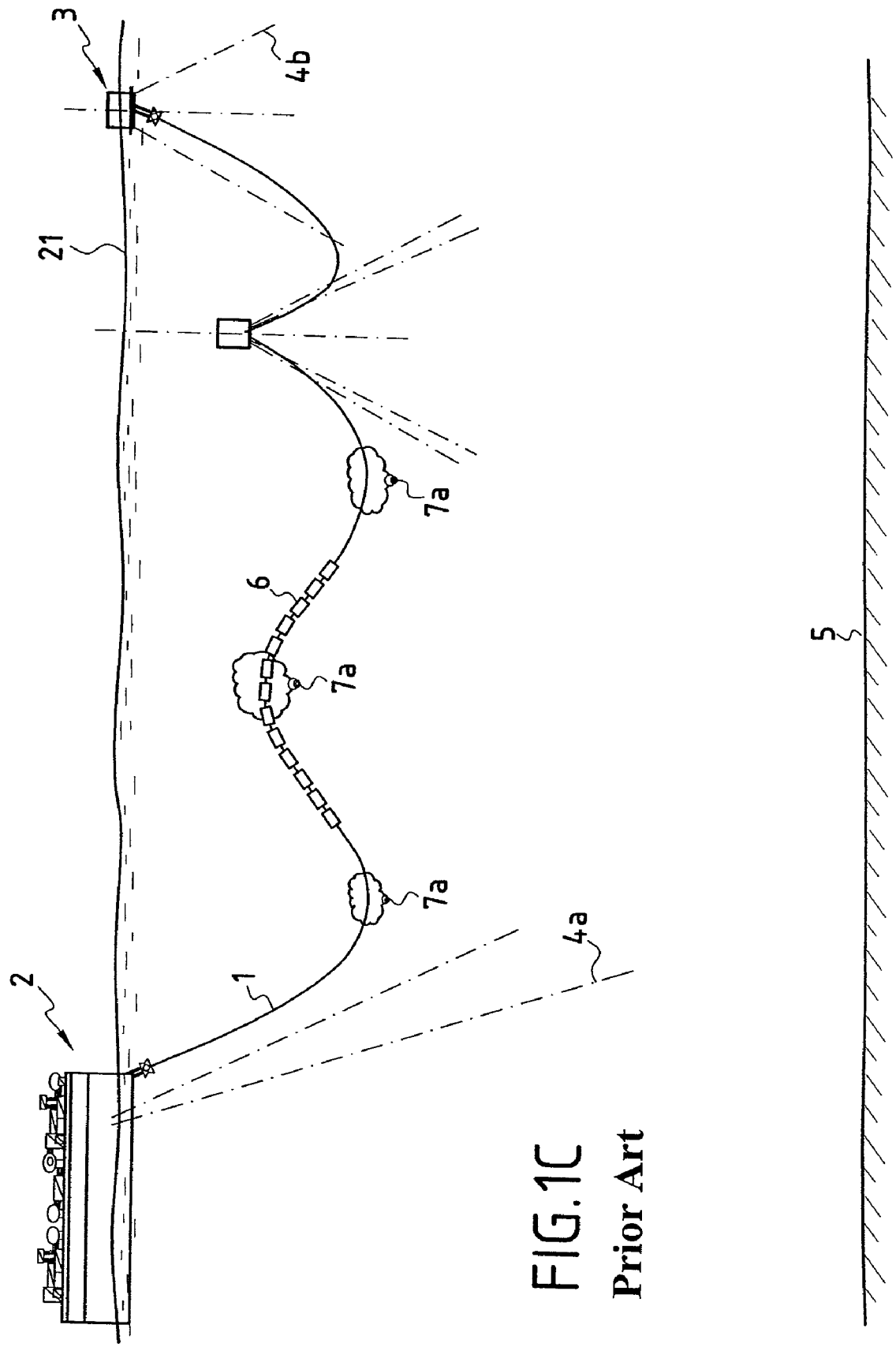
FIG. 1C is a side view of a subsurface connection device in the known W configuration associated with an intermediate undersea buoy, between an FPSO and an offloading buoy, as used in the prior art.

In FIGS. 1A, 1B, and 1C, the export pipe 1 is locally lightened by buoyancy elements 6 of the syntactic foam type installed around the rigid pipe 1 so as to invert its curvature, such that towards the surface and going from the FPSO or from the buoy, the curvature then becomes successively concave, then convex, and finally concave. Thus, in these three configurations there are two points of inflection situated respectively at opposite ends of the lightened central zone. In these three figures, there are marked zones 7a that are subjected to high levels of fatigue, and zones 7b that require the pipe to be reinforced locally. Said reinforcement is provided either by increasing the thickness of the pipe wall in stages, or by using connection pieces that are conical so as to obtain continuous variation in the thickness of such a connection piece. Such conical tubular pieces of varying thickness are very difficult to fabricate, since their length can be as much as 12 m or 15 m, or even more, and their cost, which is very high when they are made of high performance steel, becomes exorbitant when they need to be made of titanium in order to achieve strength and fatigue resistance targets.

Figure 1D:
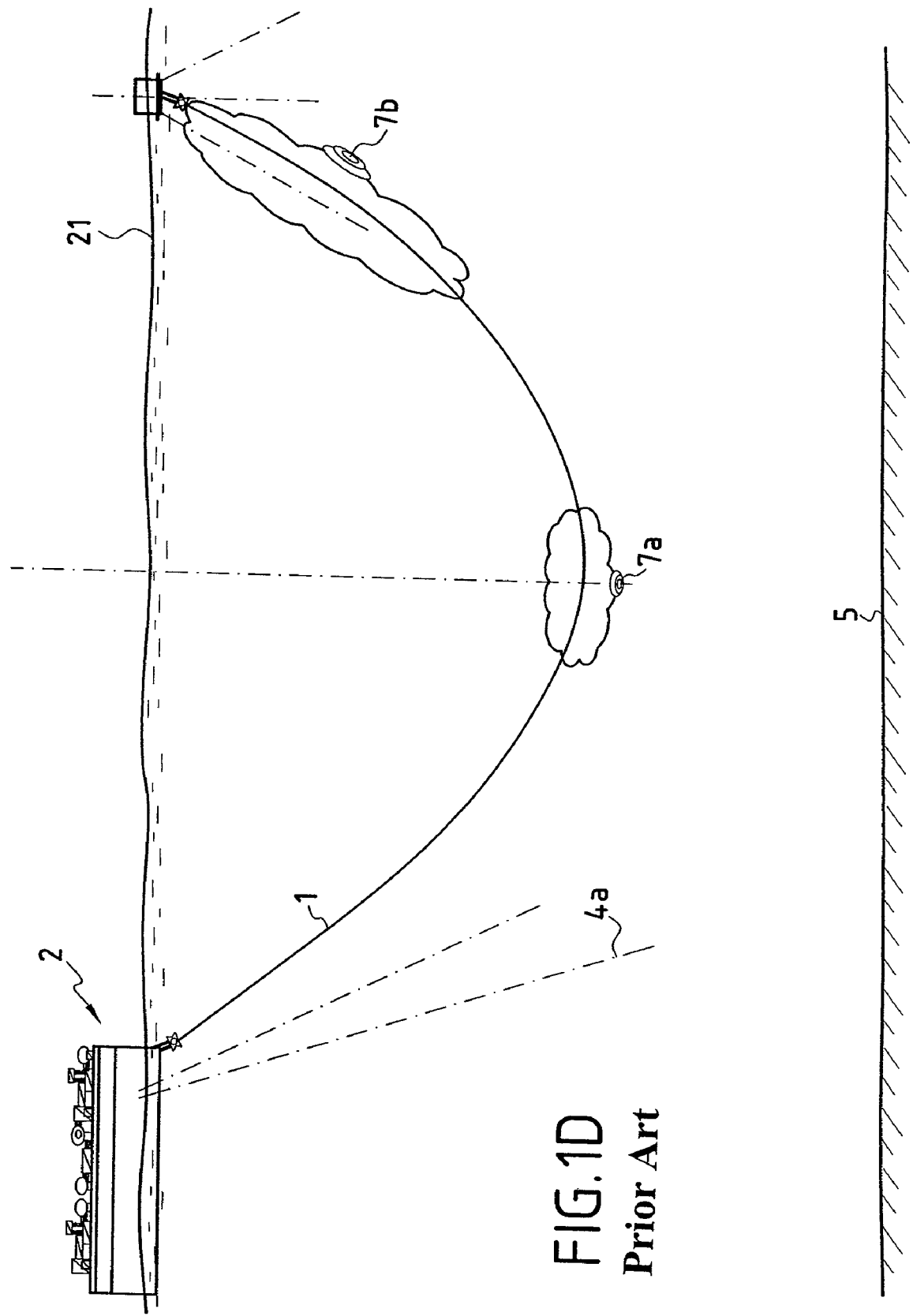
FIG. 1D is a side view of a subsurface connection device in a known simple catenary configuration, between an FPSO and an offloading buoy.

In FIG. 1D, the fatigued zone 7a is at the low part of the catenary and the zone 7b requiring reinforcement is close to the offloading buoy 3 and is to be reinforced by said conical connection piece of varying thickness.

The movements of the floating supports relative to each other are absorbed by variations in the curvature of the rigid pipe in its zones of maximum curvature, i.e. respectively at the two low points of the end catenaries presenting concave curvature and at the high point of the central catenary presenting convex curvature. This leads to large stress variations in these zones between the closest-together and furthest-apart positions of said floating supports, thereby considerably shortening the lifetime of the rigid export pipe.

Figure 2A:
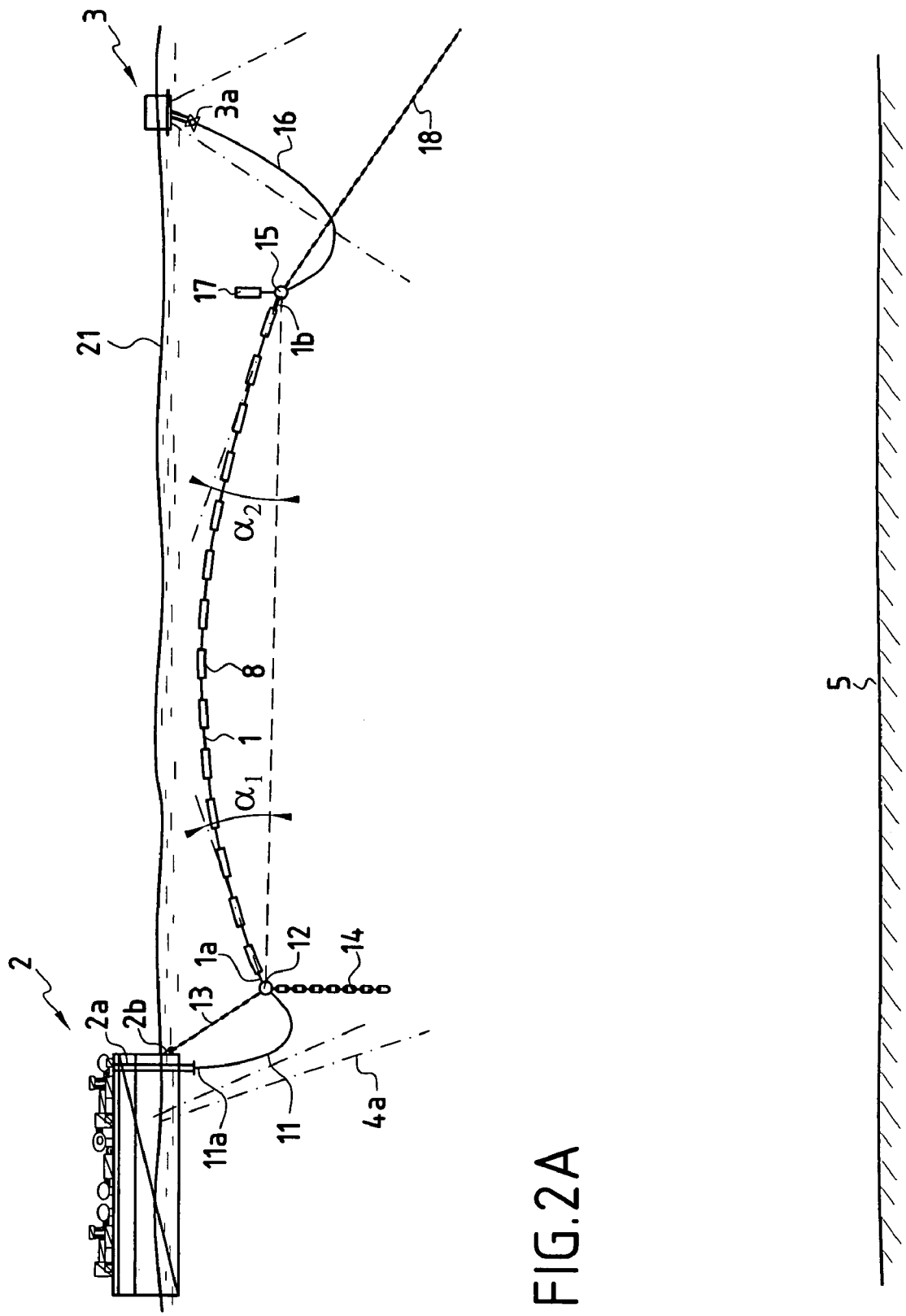
FIG. 2A is a side view of a subsurface connection device of the invention between an FPSO and an offloading buoy, constituted by a rigid pipe forming a floating arch with positive curvature (convex towards the surface), connected via flexible mechanical joints to said FPSO and to said offloading buoy at respective ends, with a heavy ballast chain at the end of the rigid pipe adjacent to the FPSO.

In FIG. 2A, there can be seen a side view of the export pipe of the invention, connecting an FPSO 2 to an offloading buoy 3, the pipe being constituted by a rigid central pipe 1 configured as a simple arch with convex curvature towards the surface. Said convex curvature is obtained by lightening the pipe by buoyancy elements 8 in discontinuous manner. Nevertheless, buoyancy is advantageously provided using foam that is disposed continuously around the pipe, thus also providing thermal insulation, such that the temperature of the crude oil being transferred remains as high as possible throughout the journey, and thus presents viscosity that is as low as possible, thereby optimizing the flow rate along the pipe. Thus, the insulating and buoyancy foam is advantageously distributed all along and around the pipe, and preferably in uniform manner.

The first end 1a of the central export pipe 1 is connected to the FPSO 2 via a first mechanical joint 12 to which a first flexible hose 11 is connected that has its opposite end terminating at 11a on a rigid pipe 2a secured to the side of said FPSO 2. This first flexible hose 11 preferably presents an inside diameter that is identical to the inside diameter of the central export pipe 1 and of the tube 12c in said first mechanical joint 12, as explained below. Said first mechanical joint 12 is connected to the FPSO 2 at an anchor point 2b by means of a mooring tensioning link such as a chain 13, preferably a cable made of steel or of composite material, and it supports ballasting means constituted by a length of heavy chain 14, e.g. weighing 100 (metric) tonnes to 200 tonnes, or constituted by a sinker of similar weight, merely hanging vertically from its point of attachment to said first mechanical joint 12.

The second end 1b of the central rigid pipe 1, adjacent to the offloading buoy 3 is connected to a second mechanical joint 15, itself connected to a second flexible hose 16 connected at 3a to the offloading buoy 3: A float 17 compensates the apparent weight of the assembly at the end of the rigid pipe 1, and a tensioning and anchoring cable 18 secured to the second mechanical joint 15 is connected at 20a to a suction anchor 20 at the sea bottom, as shown in FIG. 3. When there exist high levels of cross-current, it is advantageous to use two anchor cables 18. The two corresponding suction anchors 20 are then preferably positioned symmetrically about the vertical plane substantially containing the axes of the FPSO and of the offloading buoy.

Figure 6A:
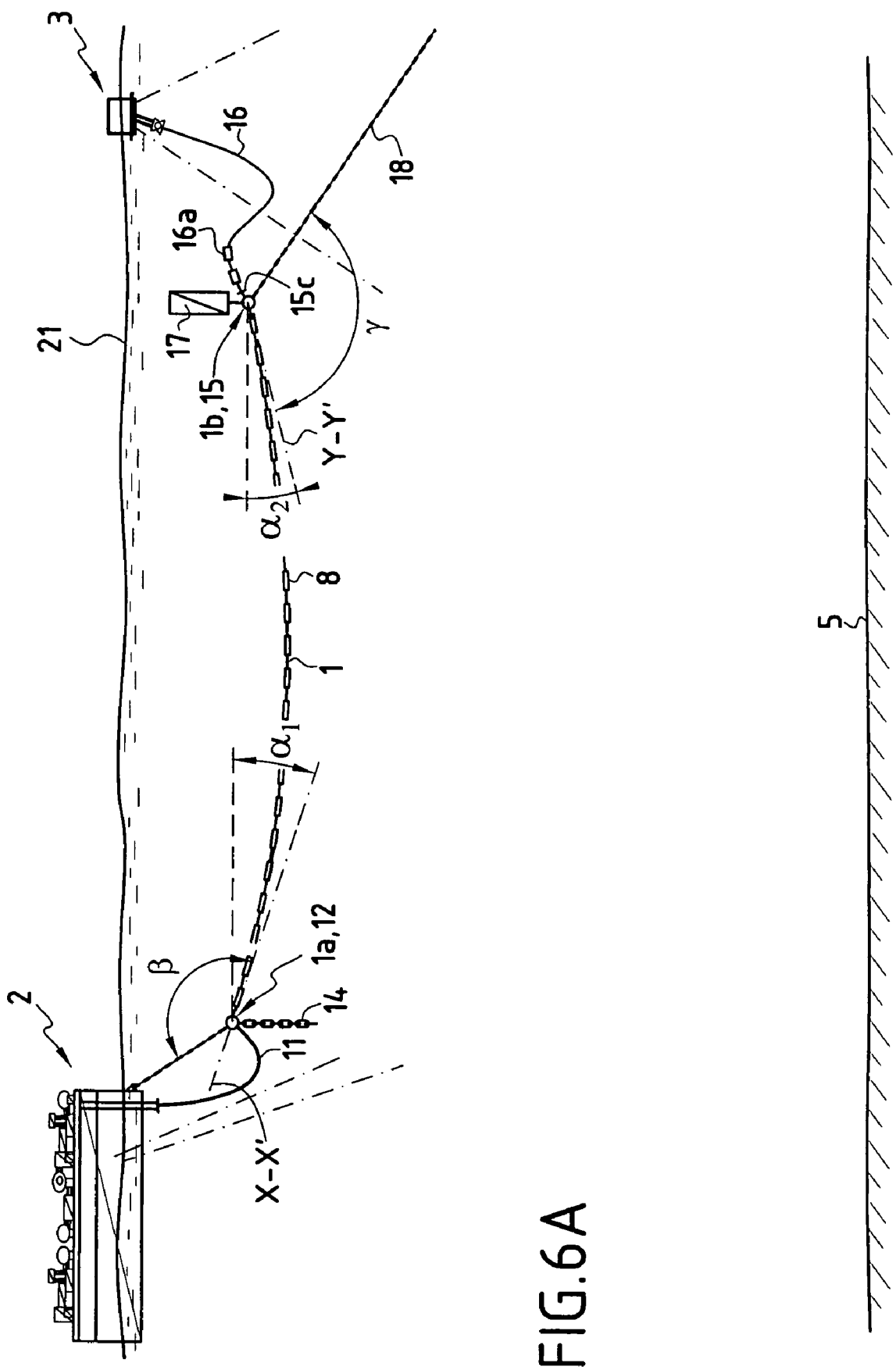
FIG. 6A shows a variant of FIG. 2A in which the arch formed by the central rigid pipe presents slightly negative buoyancy, and thus negative curvature (concave shape facing the surface)

FIG. 6A shows a variant of the invention in which the rigid central export pipe 1 is made to be slightly heavier than water by adjusting the vertical upward thrust created by the buoyancy 8 that is preferably distributed continuously all along the pipe, and that simultaneously provides thermal insulation, thereby giving the pipe concave curvature towards the surface. In this configuration, it is appropriate to reduce the weight of the heavy chain 14 or of the equivalent sinker so as to compensate for the reduced buoyancy of the rigid central export pipe 1, and in contrast it is appropriate significantly to increase the buoyancy of the float 17 compared with FIG. 2A.

In a preferred version of the invention, shown in detail in FIG. 6A, the second flexible hose 16 is fitted with floats 16a and the end of the tube 15c is curved upwards, so that said flexible hose 16 does not interfere with the anchor cable 18.

Figure 7:
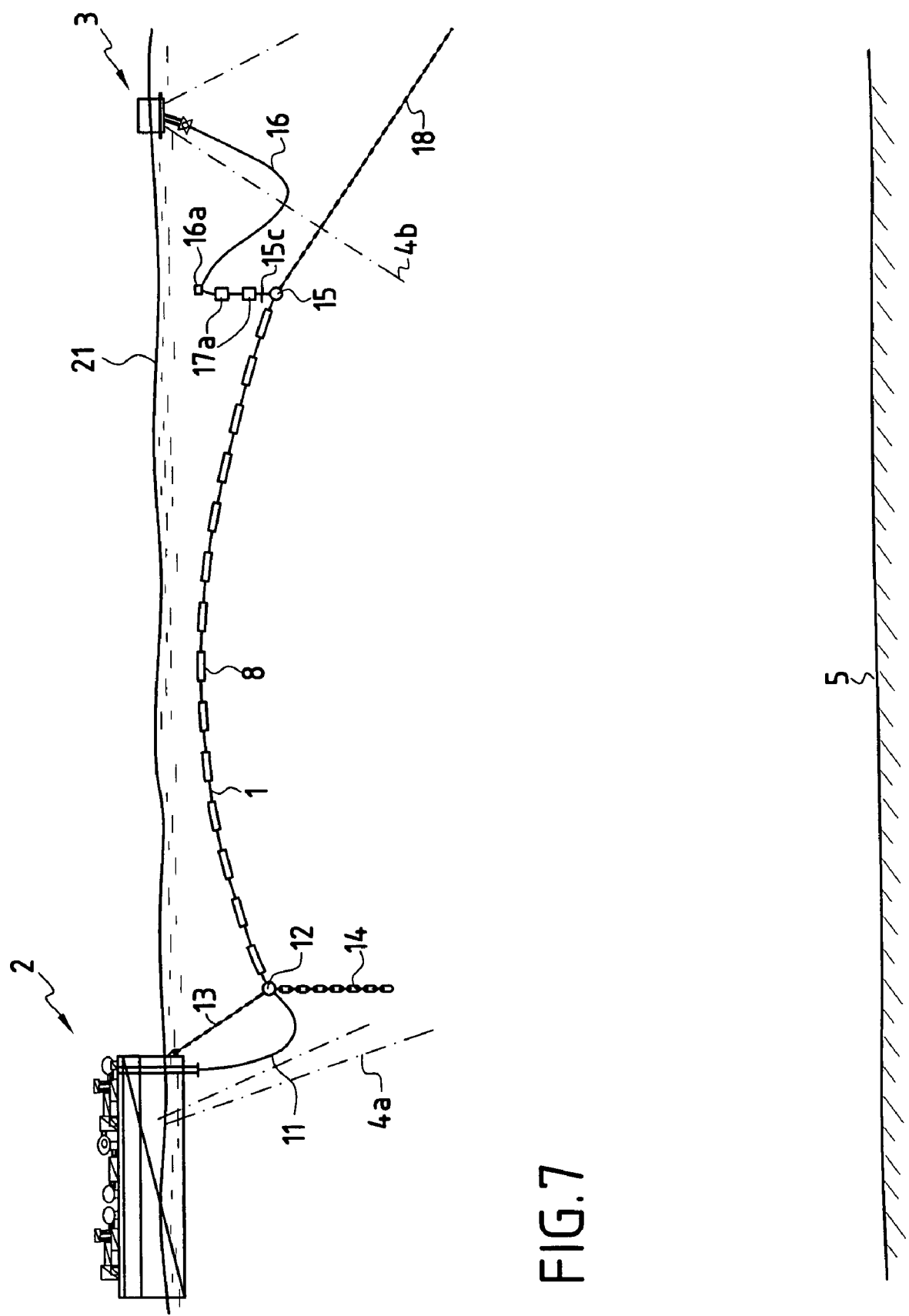
FIG. 7 shows a variant of FIG. 2A in which the flexible hose going to the offloading buoy presents an S-shaped configuration above the tensioning link serving to anchor the end of the rigid pipe to the sea bottom.

FIG. 7 is a side view of a rigid central export pipe having a configuration that is convex towards the surface, in which the second flexible hose 16 is disposed vertically above the second mechanical joint 15, with the tube 15c then being bent upwards.

The float 17 is then integrated directly in said flexible hose 16 at 17a, while an additional submerged float 16a and associated with curvature limiters (not shown) serves to maintain acceptable curvature in the high portion of the catenary of said flexible hose 16.

In FIGS. 2A, 6A, and 7, the weight of the heavy chain 14, and the buoyancy of the float are adjusted as a function of the weight per unit length of the rigid pipe 1 so that, in an almost static rest state, said rigid central pipe 1 adopts a configuration that is in the form of an arch, preferably with curvature that is substantially catenary-shaped, such that the angles $\alpha_1$, $\alpha_2$, between the half-lines of axes XX', YY' of said rigid pipe and the horizontal half-lines at each of its ends 1a, 1b extending towards the opposite ends 1b, 1a present an absolute value of less than 20°, preferably of less than 15°. The heavy chain 14 and the float 17 enable tensioning links 13 and 18 to be disposed at respective angles $\gamma$ and $\beta$ of no more than 150° and preferably no more than 100° relative to the axes XX' and YY' at the respective ends 1a and 1b of the rigid central pipes, thus enabling the relative movements of the floating supports 2 and 3 to be absorbed, in a manner that is described below.

Figure 6B:
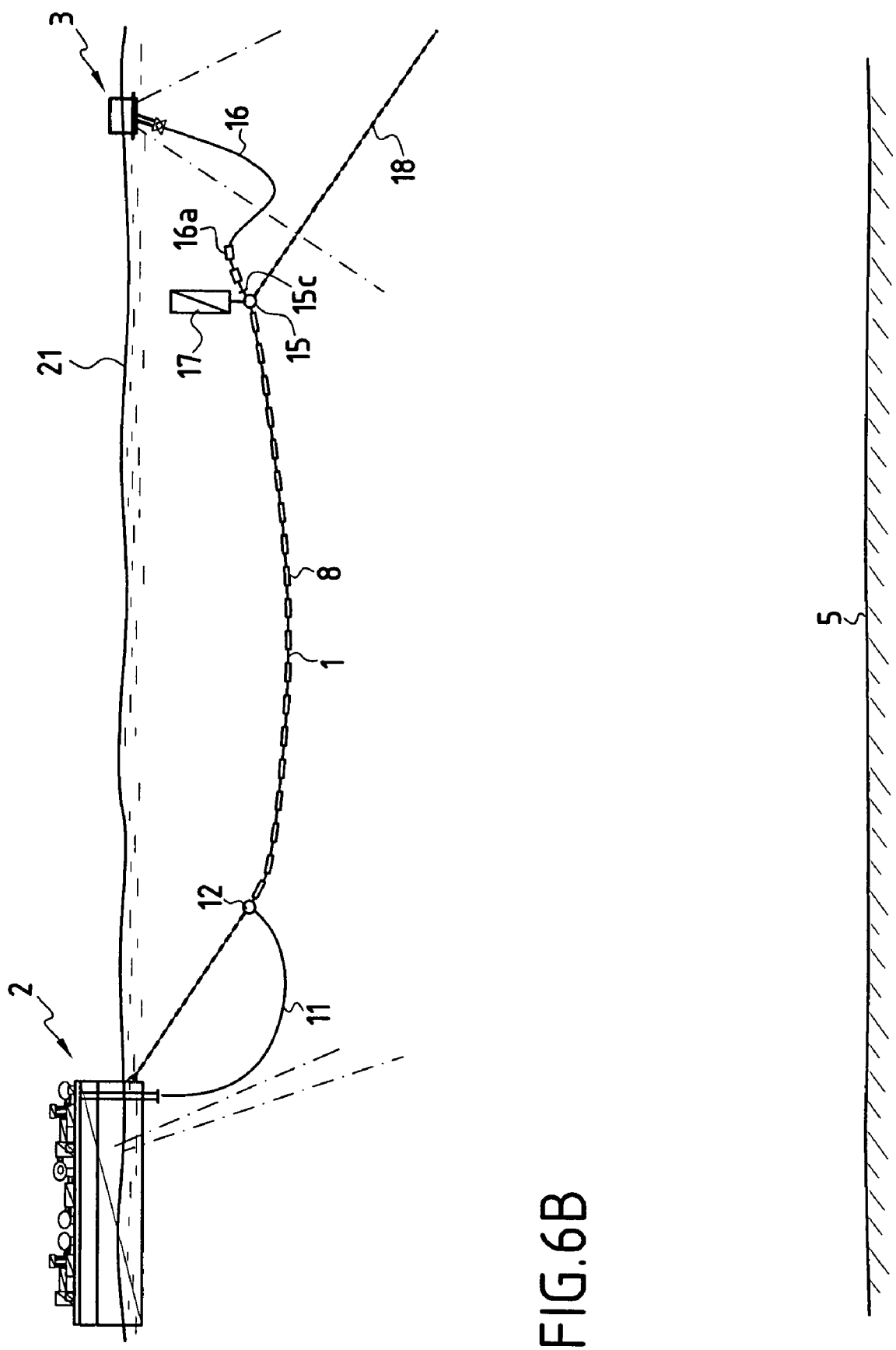
FIG. 6B shows the variant of FIG. 6A without ballasting means at the end of the central rigid pipe beside the FPSO.

In FIGS. 2B and 6B, it can be seen that the absence of a heavy chain 14 leads to the tensioning mooring link 13 at the end 1a of the rigid pipe to be practically in alignment so as to form an angle of about 180° between said tensioning link and the axis of the rigid pipe at said end 1a, such that any relative displacement between the floating support cannot be absorbed by varying this angle, and necessarily leads to large amounts of variation in the curvature of the pipe, and thus to large amounts of variation in the stresses in the pipe, thereby considerably reducing its lifetime.

Figure 4:
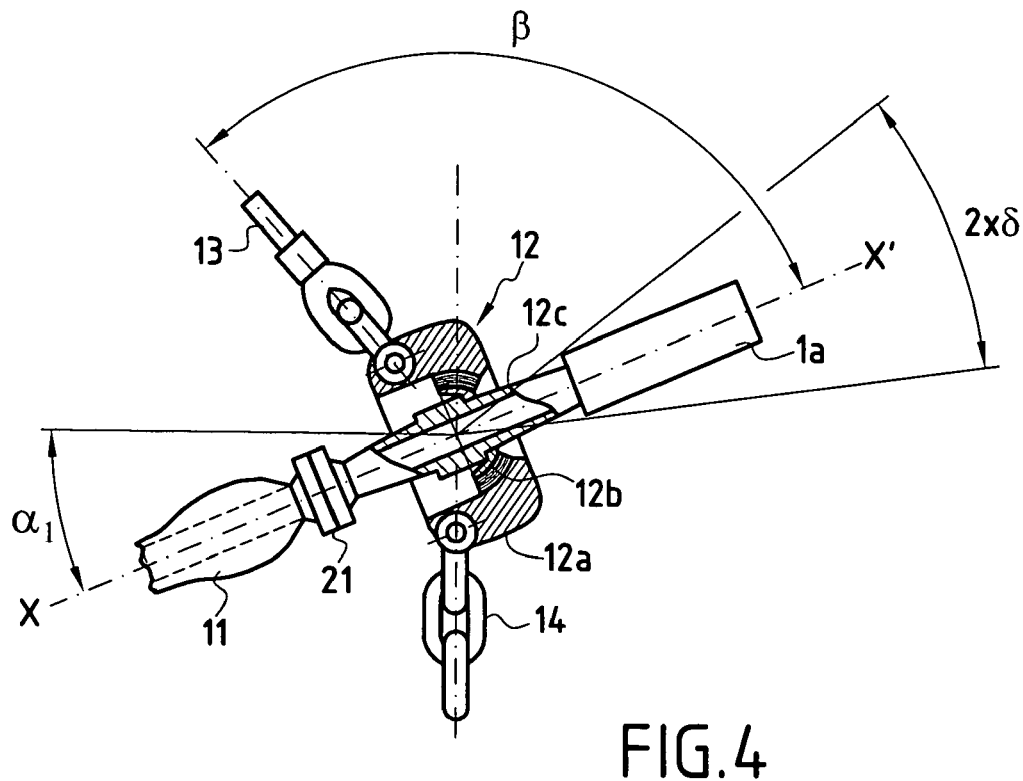
FIG. 4 is a side view in section of the flexible mechanical joint between the rigid pipe and the flexible hose at the FPSO end.

FIG. 4 is a side view in section showing a first mechanical joint 12 of the laminated abutment type, comprising a main body 12a having a central empty hollow or passage, a laminated abutment 12b, and an internal tube 12c connected on the right to the end 1a of the central export pipe 1, and on the left to the first flexible hose 11. On its outside surface, the main body 12a receives the end of the tensioning and mooring link 13 and it supports the heavy chain 14.

Figure 5:
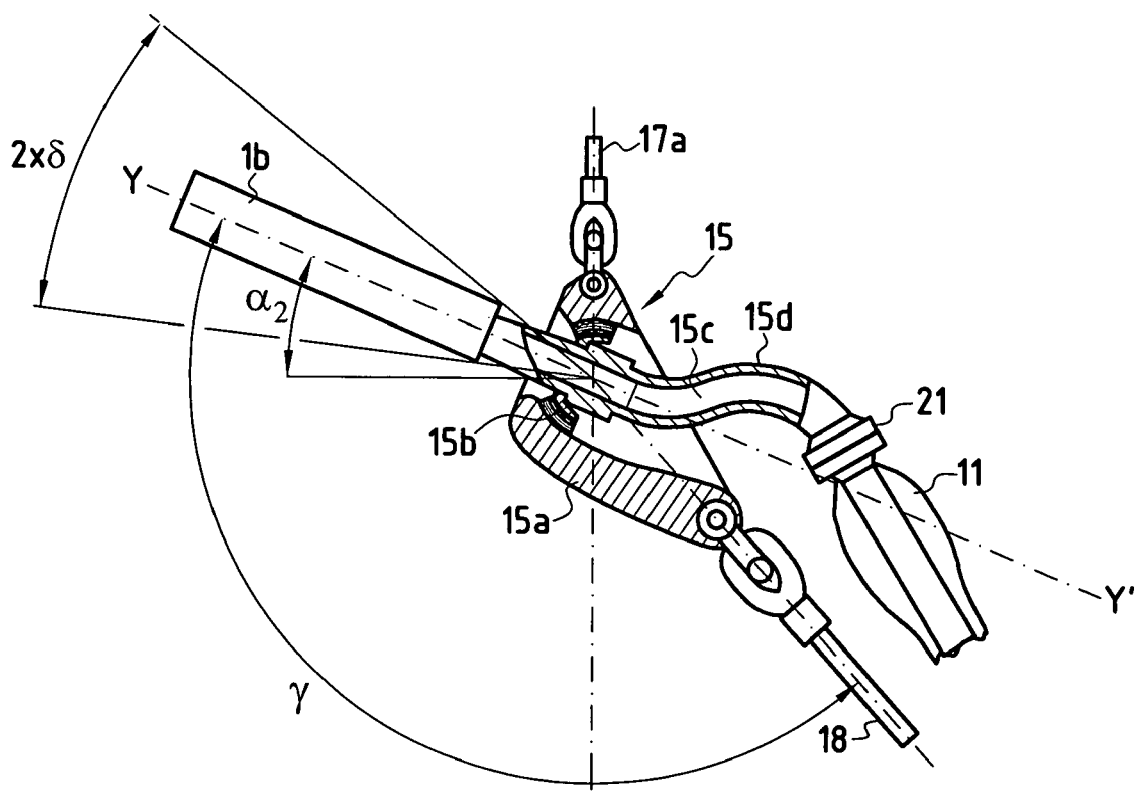
FIG. 5 is a side view in section of the flexible mechanical joint between said central rigid pipe and the flexible hose at the offloading buoy end.

FIG. 5 is a side view in section showing a second mechanical joint 15 of the laminated abutment type comprising a main body 15a, a laminated abutment 15b, and an internal tube 15c connected on the left to the other end 1b of the central export pipe and on the right to the second flexible hose 16. The main body 15a receives the end of the tensioning and anchor cable 18 and is suspended from the float 17 (not shown) by a cable 17a.

The joints 12 and 15 are initially installed on the rigid central export pipe 1 during construction thereof on board the laying vessel 22 by welding the tubes 12c and 15c directly to the ends of said rigid central pipe. The second ends of said tubes 12c, 15c are fitted with flanges enabling them to be connected to the flexible hoses for connections to the FPSO and to the offloading buoy. The central export pipe is thus continuous from flange to flange, and because of said flanges it is therefore easy to replace the end flexible hoses, should that be necessary, during maintenance operations on the installation.

The laminated abutments 12b and 15b are constituted by stacks of elastomer layers and of metal sheets that are preferably spherical in shape so as to accommodate deformation and thus variations of angle between the tubes 12c, 15c and the corresponding main body 12a, 15a. Thus, said tube can move within a cone presenting an apex angle $delta_2$, e.g. of substantially ±15°, in this example, while being capable of transmitting considerable compression forces, that can be as great as several tens or even several hundreds of tonnes, via the laminated abutments. This type of laminated abutment is known to the person skilled in the art and is produced by the supplier Techlam France, and its shape is substantially spherical, thus enabling it to have a self-centering effect leading to a better distribution of stresses within said abutment, thus avoiding risks of pinching the elastomer layers that could lead to a reduction in the performance of the mechanical joint, or even to it being destroyed.

The second mechanical joint 15 presents a laminated abutment 15b and joint functions similar to those of the first mechanical joint 12, but it is of a different shape because of the various forces that need to be balanced, which forces are completely different at opposite ends of said export pipe 1.

By way of example, the device of the invention in its mean position presents the following characteristics:

distance between the FPSO 2 and the export buoy 3, is $L1=2000$ m;

the depth of the water is $H_1=1400$ m;

the developed length of the floating arch of the central export pipe 1 is 1700 m;

the rigid export pipe 1 of steel has an inside diameter of 478 mm and a thickness of 15 mm, and it is completely filled with crude oil having relative density of 0.82;

at the FPSO end, the tensioning link 13 is 290 m long, and it is connected to a heavy chain 14 weighing 200 tonnes via the flexible mechanical joint 12 that is situated, in its static configuration, at a depth $H_2$ of about 230 m, and at a horizontal distance of $L2=200$ m from said FPSO;

the first flexible hose 11 between the FPSO and the central rigid pipe 1 is 320 m long;

the flexible mechanical joint 15 beside the offloading buoy 3 is situated at a depth $H_3=235$ m approximately, and at a horizontal distance $L_3=200$ m from the axis of said offloading buoy;

a float 17 presenting buoyancy of 85 tonnes stabilizes the second joint 15; and two anchor links 18 presenting length of 1850 m are secured to the flexible mechanical joint 15 and they are connected to two suction anchors 20 that are positioned on either side of the vertical plane containing the FPSO and the export buoy.

Under maximum disturbance, created mainly by extreme movements of the FPSO, the angles $\alpha_1$, $\alpha_2$ between the axes of the pipe at its ends relative to the horizontal do not exceed ±15°, and the arch of the central rigid pipe deforms in such a manner that its top moves vertically through a distance of about 50 m upwards, while the FPSO and the offloading buoy are tending to move towards each other, and 50 m downwards while the FPSO and the offloading buoy are tending to move apart.

The rigid export pipe 1 made of steel with an inside diameter of 478 mm and a thickness of 15 mm, and completely full of crude oil with a relative density of 0.82 presents a minimum radius of curvature (Rm) in the quasi-static rest state of the assembly such that Rm≈2000 m. The elastic limit of the steel of the pipe is $\sigma=413$ megapascals (MPa), which corresponds for the outside diameter of the pipe equal to 508 mm and for stress under bending alone restricted to 66% of the elastic limit, to an ultimate minimum radius of curvature Rmu≈130 m. Thus, in the device of the invention, the minimum radius of curvature Rm in the quasi-static rest state for the assembly is substantially equal to 15.4 times Rmu, and thus much greater than ten times Rmu.

Figure 8:
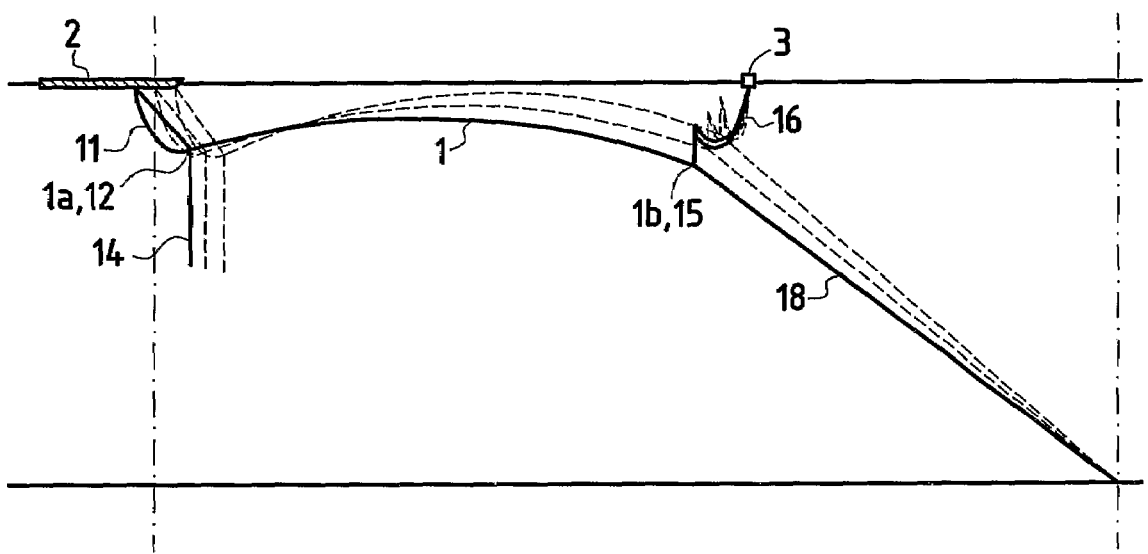
FIG. 8 shows the variation in the inclination of the mooring and anchoring tensioning links 13 and 18 at the ends 1a and 1b respectively of the rigid central pipe 1, and shows the extent to which said ends rise or sink during relative movements of the floating supports 2 and 3.

Thus, in the device of the invention, when the FPSO 2 moves away from the offloading buoy, the extra length needed is provided mainly by varying the angle $\gamma$, which corresponds to the flexible mechanical joint 12 moving a little towards the surface and to the mooring link 13 turning about its attachment point 2b on the FPSO in a counterclockwise direction, as shown in FIG. 8. Similarly, beside the offloading buoy 3, the angle β increases, the flexible mechanical joint 15 sinks a little following a circular arc centered on the anchor point 20a of the anchor cable 20, and the end 1b of the rigid pipe in the form of an arch and connected to said flexible mechanical joint 15 then sinks a little, as also shown in FIG. 8. The two flexible hoses 11 and 16 are then subjected to high levels of deformation, but this deformation leads to practically no reaction in the system, and thus to no significant stress.

Since fatigue resistance is inversely proportional to the amplitude of stress variation between maximum and minimum stress states, the rigid pipe of the invention thus presents fatigue behavior that is improved ten or more times compared with the prior art devices shown in FIGS. 1A-1D. In conventional systems, movements of the FPSO and the buoy moving towards each other and apart are absorbed solely by deformation of the rigid pipe forming three arches in the configurations of FIGS. 1A, 1B, and 1C and only one arch in the configuration of FIG. 1D. These levels of deformation remain large and the radii of curvature vary over a large range in the zones 7a, thereby leading to large variations of stress between the minimum and maximum values, thus radically reducing the fatigue behavior of the rigid export pipe.

Thus, the arch of the export pipe of the invention makes it possible to achieve a theoretical fatigue lifetime of the order of 10,000 years for welding of quality that is standard in the off-shore industry, which can be considered as a lifetime that is practically infinite, whereas the theoretical fatigue lifetimes of conventional systems lead to values of 300 years to 500 years, thus giving such prior art systems an operating safety factor of 10 to 15 compared with the actual desired lifetime of installations which is 25 years to 30 years, or even longer. This factor of 10 to 15 is presently commonly considered by oil field operators as being insufficient to guarantee that the installation is safe in operation. The device of the invention enables this safety factor to be increased radically by as much as 20 times to 30 times, while being capable of being implemented using technology that is proven, with prefabrication and installation costs that are small.

Figure 9A:
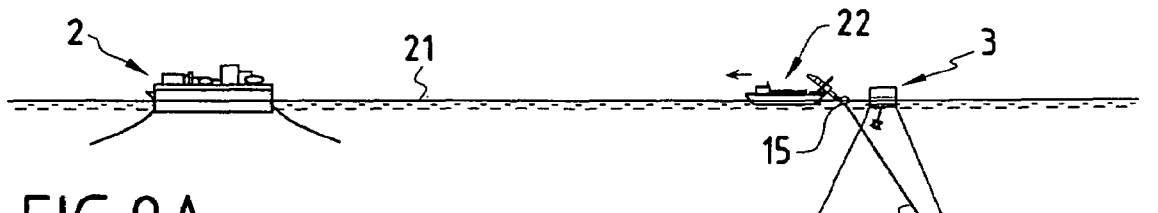
FIGS. 9A to 9D show various stages in installing a transfer device of the invention.
Figure 9B:
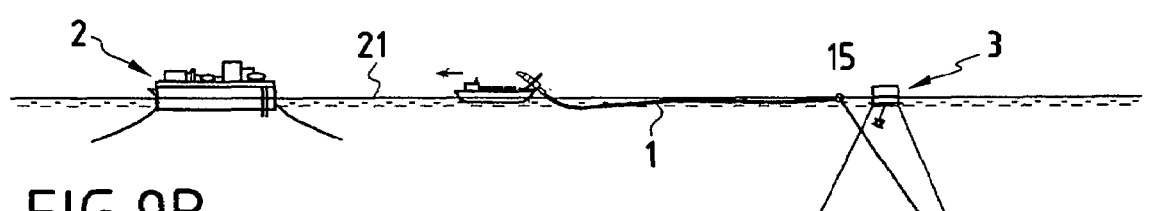
Figure 9C:
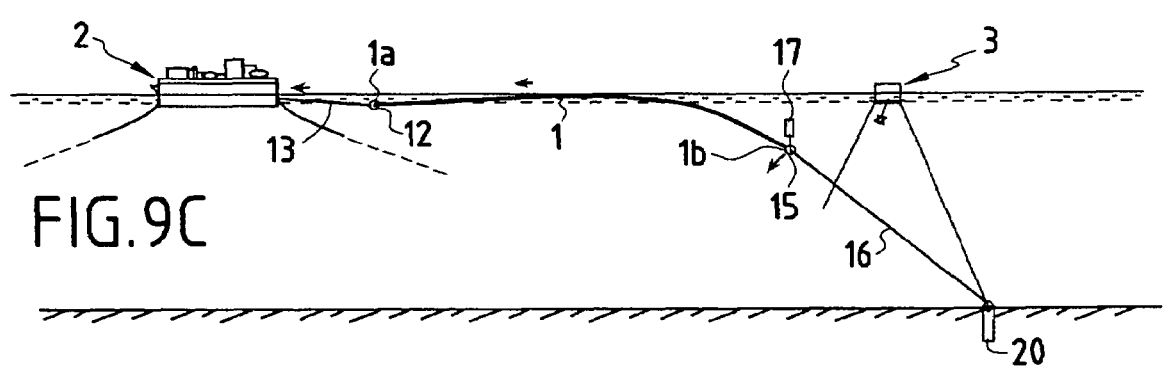
Figure 9D:
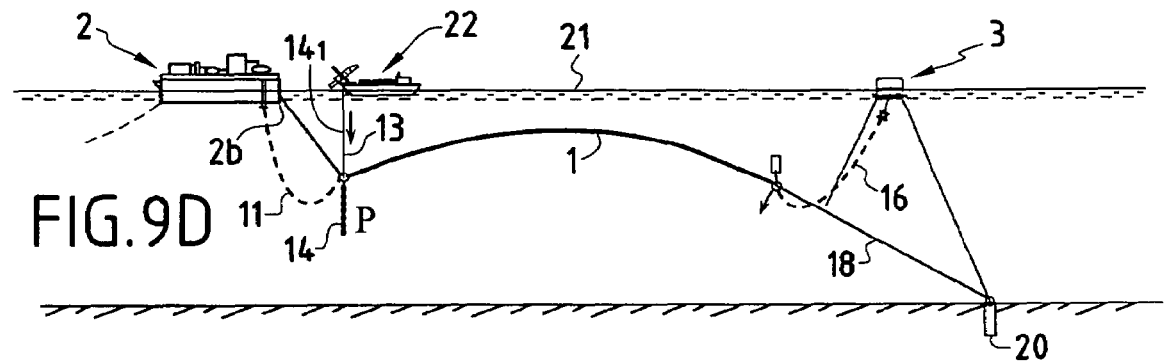

FIGS. 9A to 9D show the various stages involved in installing the transfer device of the invention which comprises the following successive steps:

the suction anchor 20 is installed together with a first tensioning link or anchor cable 18 which is taken to the surface (FIG. 9A);

the laying ship 22 fitted with a J-lay tower connects the first end 1b of the rigid central pipe 1 to the end of the anchor cable 18 via a first flexible joint 15, said end 1b of the pipe already being connected to the tube 15c of the flexible mechanical joint 15, which is thus connected to the main body 15a at the end of the anchor cable 18 (FIG. 9B);

the entire rigid pipe 1 is assembled from successive elements presenting a unit length of 50 m, the buoyancy and thermal insulation elements (not shown) being installed simultaneously around the pipe, which pipe then floats on the surface 21;

the second end 1a of the rigid pipe 1 is fitted with a second flexible mechanical joint 12, and a second tensioning link or mooring cable 13 is connected to said second flexible mechanical joint 12, and the second end of the mooring cable 13 is connected to the cable of a winch (not shown) situated on board the FPSO (FIG. 9C);

a float 17 is connected to the first flexible mechanical joint 15 floating close to the surface of the water; said second end of said mooring cable 13 is then pulled by said winch towards the FPSO and is connected to said FPSO at 2b;

the heavy chain 14 is then put into place at said second flexible joint 12 with the help of a branch cable $14_1$ from the laying ship 22 (FIG. 9D); and then the two flexible hoses 11 and 16 are installed at the respective ends 1a and 1b of the rigid central pipe 1 so as to obtain the mean final configuration of FIG. 2.

It remains within the spirit of the invention if two rigid pipes in the form of arches 1 are installed in parallel, each then possessing respective flexible mechanical joints pieces 12 and 15 at its ends, said joint 12 beside the FPSO being preferably independent from each other, i.e. each of the rigid pipes 1 is connected to its own mooring link 13 and its own heavy chain 14. Beside the offloading buoy 3, the mechanical joint pieces 15 are preferably connected to a common anchoring link 18, and where appropriate to a common float 17.

This configuration makes it possible to save on one additional suction anchor (30 tonnes) and one additional anchoring link (1500 m to 2000 m depending on the depth of the water), which then do not need to be installed on the sea bottom.

This disposition using "parallel lines" presents the advantage of enabling the lines to be purged between two loading operations so as to ensure that paraffin-containing crude does not solidify in the pipes due to the assembly cooling. In order to perform such purging, diesel oil is advantageously pumped from the FPSO into the first pipe, and an appropriate set of valves situated at the loading buoy is used to cause the fluid to return towards the FPSO via the second pipe. Once purging has been achieved, the line is safe, and can wait for a subsequent loading operation, where the line will be purged with crude oil, with the diesel oil being recovered for the next cycle, and the two pipes are then put back into parallel operation for exporting crude oil at the maximum rate towards the tanker that has come to take it.

The invention claimed is:

1. A device for transferring fluid between two floating supports anchored to the sea bottom, the device comprising a rigid pipe installed below the surface, said rigid pipe having first and second ends connected to said two floating supports via respective flexible hoses, wherein:

a) a main portion of said rigid pipe includes or co-operates with buoyancy elements such that in a quasi-static rest state, said rigid pipe adopts a configuration of a single curved arch extending essentially from said first end to said second end; and b) said flexible hoses are of lengths and curvatures such that variations in the curvatures of said flexible hoses are suitable for compensating movements of said floating supports; and c) said rigid pipe is connected at each of said first and second ends by a tensioning link, said tensioning links being connected respectively:

at said first end to one of said floating supports, said first end including or co-operating with ballasting means; and at said second end, to the sea bottom, said second end including or co-operating with additional buoyancy means.

2. The transfer device according to claim 1, wherein in the quasi-static rest state, said rigid pipe is substantially catenary-shaped such that angles between half-lines of axes of said rigid pipe and horizontal half-lines at each of said first and second ends extending towards the other end present absolute values of less than 20°.

3. The transfer device according to claim 2, wherein said angles are less than 15°.

4. The device according to claim 1, wherein said first end of said rigid pipe is connected to a more stable floating support of said two floating supports.

5. The device according to claim 1, wherein said two floating supports are constituted respectively by a floating support of FPSO type and by an offloading buoy.

6. The device according to claim 5, wherein said rigid pipe is connected at said first end to said floating support of FPSO type.

7. The device according to claim 1, wherein said tensioning links form angles relative to axes of said rigid pipe at said first and second ends, which angles are suitable for varying and moving the ends of said rigid pipe vertically when said floating supports move and a distance between said floating supports varies, said angles presenting values when the device is in the quasi-static rest state that are less than 150°.

8. The device according to claim 7, wherein said angles are less than 100°.

9. The device according to claim 1, wherein:
said ballasting means are constituted by a chain suspended at said first end; and
said buoyancy means are constituted by a buoy from which said second end is suspended.

10. The device according to claim 1, wherein said flexible hoses are connected to said first and second ends of said rigid pipe via flexible mechanical joints each comprising:
a rigid tube connected at its ends to one of said first and second ends of said rigid pipe and to one of said flexible hoses; and
a main body constituting a forging defining:
an outside surface to which one of said tensioning links is connected; and
an inside surface defining an empty passage through which said rigid tube passes;
said inside surface of said main body and said rigid tube supporting a laminated abutment comprising layers of elastomer that are circularly symmetrical about a respective axis, providing a flexible mechanical connection between said main body and said rigid tube, so as to allow said tube to move angularly relative to said main body within a cone having an angle at an apex lying substantially on said axis of symmetry of said laminated abutment and presenting a maximum value d equal to 15°.

11. The device according to claim 10, wherein said rigid tube providing the connection between said rigid pipe and one of said flexible hoses presents an upwardly-curved end beside a flexible connection.

12. The device according to claim 1, wherein one of said floating supports is an offloading buoy and one of said flexible hoses providing the connection between said rigid pipe and said offloading buoy, presents an S-shaped configuration.

13. The device according to claim 1, wherein said rigid pipe includes buoyancy elements constituted by a thermally-insulating foam distributed all along and all around said rigid pipe.

14. The device according to claim 1, wherein said rigid pipe presents curvature that is convex towards the surface of the sea.

15. The device according to claim 1, wherein said rigid pipe presents curvature that is concave towards the surface of the sea.

16. The device according to claim 1, wherein angles between axes of said rigid pipe at each said first and second ends, and the horizontal, are maintained at an absolute value lying in the range from 2° to 20°.

17. The device according to claim 16, wherein said angles are in the range from 5° to 15°.

18. The device according to claim 1, wherein a minimum radius of curvature of said rigid pipe is in the form of a catenary curve and in the range of 750 m to 1500 m.

19. The device according to claim 1, wherein said rigid pipe includes buoyancy elements constituted by a thermally-insulating foam distributed all along and all around said rigid pipe in substantially uniform and continuous manner so as to provide both thermal insulation and buoyancy for said rigid pipe.

20. A method of installing a device according to claim 1 at sea, from a laying ship on the surface, the method comprising the following successive steps:
1) connecting one of said tensioning links to the sea bottom;
2) assembling and laying said rigid pipe by assembling together unit pipe elements that include or co-operate with said buoyancy elements, a first unit pipe element being fastened to the end of said one of said tensioning links;
3) fastening another of said tensioning links to an end of a last pipe element, and then to a second one of said floating supports or to the sea bottom;
4) installing said ballasting means and said buoyancy means at the ends of said rigid pipe; and then
5) installing said flexible hoses between a respective one of said floating supports and a respective one of said first and second ends of said rigid pipe.

21. The method according to claim 20, wherein:
in step 1), said one of said tensioning links is connected to the sea bottom beside a less stable one of said floating supports; and
in step 3), said another of said tensioning links is fastened to a more stable one of said floating supports.

22. The method according to claim 20, wherein, in step 1), said first floating support is an offloading buoy.

23. The method according to claim 20, wherein, in step 3), said second floating support is of FPSO type.

24. A device for transferring fluid between two floating supports anchored to the sea bottom, the device comprising a rigid pipe installed below the surface, said rigid pipe having first and second ends connected to said two floating supports via respective flexible hoses, wherein:
a) a main portion of said rigid pipe includes or co-operates with buoyancy elements such that in a quasi-static rest state, said rigid pipe adopts a configuration of a curved arch; and
b) said flexible hoses are of lengths and curvatures such that variations in the curvatures of said flexible hoses are suitable for compensating movements of said floating supports; and
c) said rigid pipe is connected at each of said first and second ends by a tensioning link, said tensioning links being connected respectively:
at said first end to one of said floating supports, said first end including or co-operating with ballasting means; and
at said second end, to the sea bottom, said second end including or co-operating with additional buoyancy means;
wherein said flexible hoses are connected to said first and second ends of said rigid pipe via flexible mechanical joints each comprising:
a rigid tube connected at its ends to one of said first and second ends of said rigid pipe and to one of said flexible hoses; and a main body constituting a forging defining:
  an outside surface to which one of said tensioning links is connected; and
  an inside surface defining an empty passage through which said rigid tube passes;
said inside surface of said main body and said rigid tube supporting a laminated abutment comprising layers of elastomer that are circularly symmetrical about a respective axis, providing a flexible mechanical connection between said main body and said rigid tube, so as to allow said tube to move angularly relative to said main body within a cone having an angle at an apex lying substantially on said axis of symmetry of said laminated abutment and presenting a maximum value d equal to 15°.

* * * * *